United States Patent
Goodson et al.

(10) Patent No.: US 7,760,624 B1
(45) Date of Patent: Jul. 20, 2010

(54) NETWORK ACCESS DEVICE AND METHOD FOR PROTECTING SUBSCRIBER LINE COMMUNICATIONS

(75) Inventors: Richard L. Goodson, Huntsville, AL (US); Arlynn W. Wilson, Huntsville, AL (US); Kevin W. Schneider, Huntsville, AL (US)

(73) Assignee: ADTRAN, Inc., Huntersville, AL (US)

( * ) Notice: Subject to any disclaimer, the term of this patent is extended or adjusted under 35 U.S.C. 154(b) by 1331 days.

(21) Appl. No.: 11/074,918

(22) Filed: Mar. 8, 2005

(51) Int. Cl.
*G01R 31/08* (2006.01)
(52) U.S. Cl. ................ 370/228; 370/217; 370/219; 370/225
(58) Field of Classification Search ............ 370/217, 370/219, 225, 228
See application file for complete search history.

(56) References Cited

U.S. PATENT DOCUMENTS

| 6,128,300 | A  | * | 10/2000 | Horton ................ 370/395.65 |
| 6,483,029 | B1 |   | 11/2002 | Lutz, Jr. |
| 6,724,880 | B1 | * | 4/2004  | Lynch ................ 379/219 |
| 6,801,533 | B1 |   | 10/2004 | Barkley |
| 6,862,644 | B1 |   | 3/2005  | Pendleton et al. |
| 6,868,060 | B2 | * | 3/2005  | Barzegar et al. ........... 370/228 |
| 7,039,732 | B1 | * | 5/2006  | House ................ 710/100 |
| 2004/0114510 | A1 | * | 6/2004 | Miller et al. ............ 370/217 |
| 2005/0243497 | A1 | * | 11/2005 | Cameron et al. ........... 361/119 |

\* cited by examiner

*Primary Examiner*—Jason E Mattis
(74) *Attorney, Agent, or Firm*—Lanier Ford Shaver & Payne, P.C.; Jon E. Holland (57) ABSTRACT

A network access device comprises a first line card, a second line card, and logic. The first line card has a first transceiver coupled to a first subscriber line, and the second line card has a second transceiver coupled to a second subscriber line. The logic is configured to switch communication from the first subscriber line to the second subscriber line in response to a detection of an error condition for communication occurring over the first subscriber line.

10 Claims, 6 Drawing Sheets

NETWORK ACCESS DEVICE AND METHOD FOR PROTECTING SUBSCRIBER LINE COMMUNICATIONS

RELATED ART

A network access device, such as a digital subscriber line access multiplexer (DSLAM), is typically used to interface a plurality of subscriber lines with at least one high-speed network connection, such as a fiber optic cable. Such a network access device normally comprises a plurality of line cards and at least one controller card inserted into a chassis that holds each of the line cards and the controller card. Each of the line cards comprises a plurality of transceivers or ports for communicating over a plurality of subscriber lines. Data from the subscriber lines is transmitted over a backplane of the chassis to the controller card. Circuitry on the controller card multiplexes the data streams from multiple line cards'into a single data stream for transmission over the high-speed network connection.

Circuitry on the controller card also demultiplexes data from the high-speed network connection into a plurality of data streams that are transmitted over the backplane of the chassis to different transceivers on the line cards. Each such data stream comprises the data that is to be transmitted by the transceivers on the line card that receives the data stream. For each line card, a multiplexer on the line card demultiplexes the received data stream across a plurality of transceivers for communication across a plurality of subscriber lines interfaced with the line card. Accordingly, the network access device effectively demultiplexes the data stream from the high-speed network connection across the subscriber lines that are interfaced with the network access device.

For typical network access devices, such as the one described above, subscriber lines servicing the same customer equipment are typically interfaced with the same line card. Thus, when demultiplexing the data stream from the high-speed network connection, circuitry on the controller card transmits data associated with the same destination to the same line card. On this line card, the data can be demultiplexed across multiple transceivers that transmit over different subscriber lines to the same destination.

It has been theorized that the multiplexing and demultiplexing typically performed on the line cards can be moved to the controller card. The process of performing such multiplexing and demultiplexing at a centralized location external to the line cards is generally referred to as "centralized bonding." For a network access device that might employ centralized bonding, circuitry on a controller card would multiplex data from the high-speed network connection into a plurality of data streams, each of which is to be transmitted over a different subscriber line. Each such data stream would be transmitted over the backplane directly to a transceiver for communication over a respective subscriber line. Thus, multiplexing or demultiplexing of data at the line cards would be unnecessary. It has been theorized that such a configuration would enable maximal use of the ports defined by the network access device.

As an example, assume that a line card has only one available port (i.e., the other ports of the line card are already allocated for use with the communication equipment of one or more customers). Also assume that a new customer requires a plurality of ports to accommodate his equipment. Using centralized bonding, it would be possible to use the one available port plus one or more ports on a second line card to accommodate the equipment of the new customer, thereby reducing the number of ports needed on the second line card.

Unfortunately, line cards or line card components sometime fail such that many or all of the transceivers of a line card are unable to properly communicate. As an example, if a line card's power supply fails, each of the transceivers on the line card may become inoperative. For many failures, a technician must diagnose the source of the problem and then take corrective action to fix the problem. For example, a technician may replace a defective or failed line card in order to restore communication for equipment that is interfaced with the defective or failed line card. However, the diagnosis and repair process can be quite time consuming and burdensome, and a failure of a line card or a line card component can significantly disrupt the communication services provided to one or more customers.

SUMMARY OF THE DISCLOSURE

Generally, embodiments of the present disclosure provide devices and methods for protecting subscriber line communications.

A device in accordance with one embodiment of the present disclosure comprises a first line card, a second line card, and logic. The first line card has a first transceiver coupled to a first subscriber line, and the second line card has a second transceiver coupled to a second subscriber line. The logic is configured to switch communication from the first subscriber line to the second subscriber line in response to a detection of an error condition for communication occurring over the first subscriber line.

A method in accordance with one embodiment of the present disclosure comprises the steps of: providing a first line card having a first transceiver coupled to a first subscriber line; providing a second line card having a second transceiver coupled to a second subscriber line; detecting an error condition associated with communication occurring over the first subscriber line; and switching communication from the first subscriber line to the second subscriber line in response to the detecting step.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to devices and methods for protecting subscriber line communications. In one exemplary embodiment, communication through a network access device, such as a digital subscriber line access multiplexer (DSLAM), is backed up in order to accommodate a line card failure within the network access device. In particular, at least one primary subscriber line and at least one backup subscriber line are used to provide service to communication equipment of a particular customer. In configuring a network access device to be interfaced with the subscriber lines, a service provider ensures that the backup subscriber line and the primary subscriber lines are interfaced with transceivers on different line cards of the network access device. Indeed, in a preferred embodiment, the service provider ensures that each subscriber line servicing the same communication equipment of the particular customer is interfaced with a transceiver on a different line card.

If communication over a primary subscriber line is significantly degraded or interrupted due, for example, to failure of the line card interfaced with the primary subscriber line, then communication is switched from this primary subscriber line to the backup subscriber line. Since a primary subscriber line and backup subscriber line are interfaced with different line cards, a failure of the line card interfaced with a primary subscriber line is not likely to affect the operation of the backup subscriber line. Thus, service with the communication equipment of the particular customer can be maintained despite a failure of the line card interfaced with a primary subscriber line.

Figure 1:
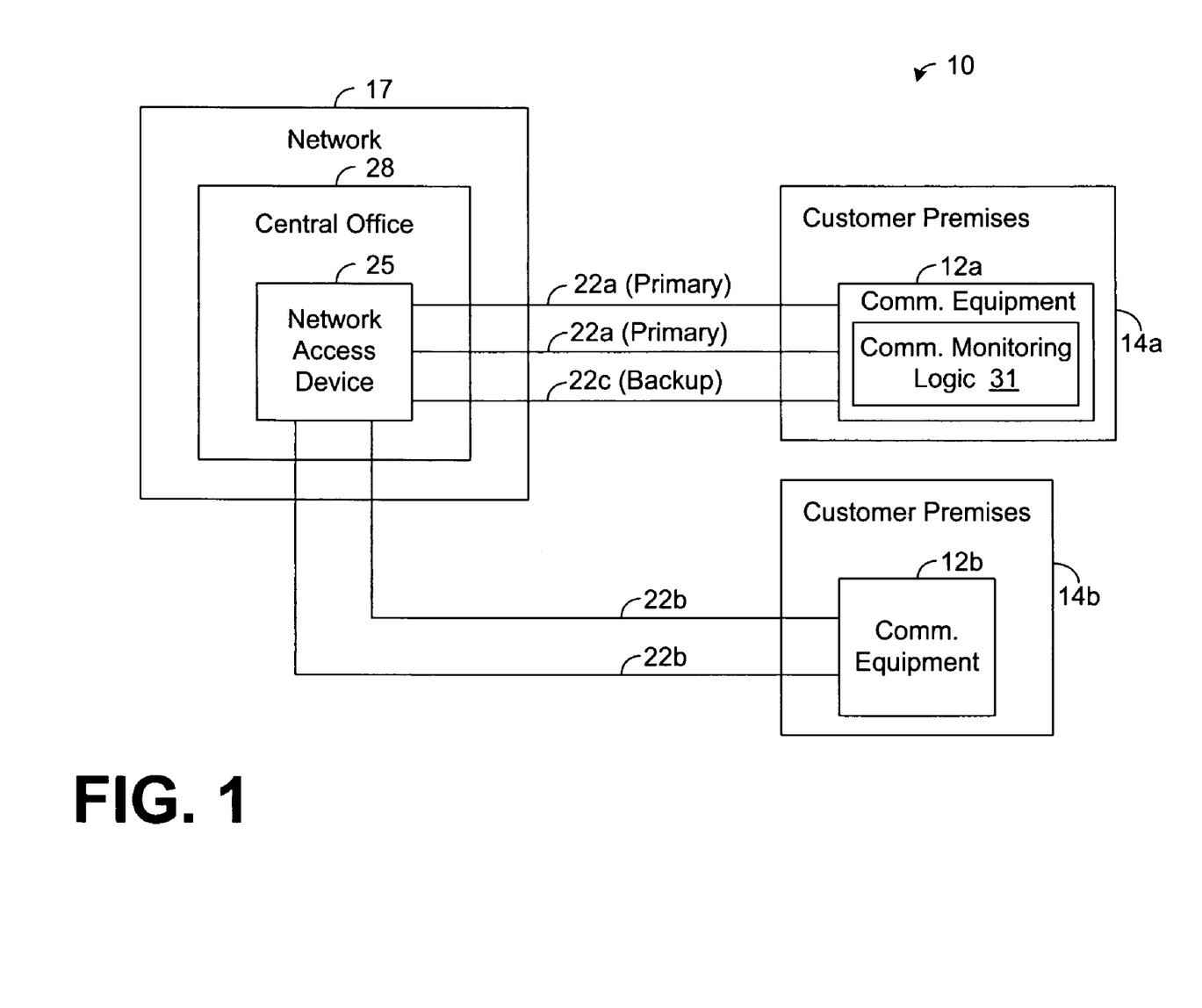
FIG. 1 is a block diagram illustrating an exemplary network communication system in accordance with one embodiment of the present disclosure.

FIG. 1 depicts a communication system 10 in accordance with one exemplary embodiment of the present disclosure. As shown by FIG. 1, the system 10 comprises communication equipment 12a and 12b, respectively, residing at customer premises 14a and 14b. Each set of communication equipment 12a and 12b may comprise one or more communication devices, such as one or more modems, for example, for communicating with a network 17.

Subscriber lines 22a, 22b, and 22c couple communication equipment 12a and 12b to a network access device 25, such as a DSLAM, of a central office 28 within the network 17. Each of the subscriber lines 22a, 22b, and 22c may comprise a pair of conductive wires, sometimes referred to as a "twisted pair," to provide a communication medium.

In the example shown by FIG. 1, a backup subscriber line 22c and two primary subscriber lines 22a couple the communication equipment 12a to the network access device 25. In other embodiments, other numbers of primary subscriber lines 22a and backup subscriber lines 22c may be employed.

During normal operation, the communication equipment 12a communicates with the central office 28 over the primary subscriber lines 22a while the backup subscriber line 22c is idle. However, it should be noted that it is possible for at least some communication to occur over the backup subscriber line 22c during normal operation. For example, it is possible to utilize the backup subscriber line 22c as a control channel or as a medium for providing error checking information or other types of information. Commonly-assigned U.S. patent application Ser. No. 10/668,030 entitled, "Data Communication System and Method for Selectively Implementing Forward Error Correction," which is incorporated herein by reference, describes exemplary uses for the backup subscriber line 22c.

If communication over one of the primary subscriber lines 22a becomes significantly degraded or interrupted, then communication may be switched from the degraded subscriber line 22a to the backup subscriber line 22c. In this regard, communication monitoring logic 31 monitors the communication occurring over the primary subscriber lines 22a. The logic 31 can detect interruption of the communication occurring over a primary subscriber line 22a by determining that the communication equipment 12a is no longer receiving signals from this primary subscriber line 22a. In addition, the logic 31 can detect other error conditions via other techniques. For example, the logic 31 can detect that an error condition has caused significant signal degradation by calculating the signal-to-noise ratio for the signals received from a primary subscriber line 22a and comparing this ratio to a specified threshold. If the signal-to-noise ratio falls below the specified threshold, the logic 31 can be configured to switch communication from the degraded subscriber line 22a to the backup subscriber line 22c. Exemplary techniques for detecting interruption and degradation of communication occurring over a primary subscriber line for the purposes of determining whether the communication is to be switched to a backup subscriber line are described in U.S. patent application Ser. No. 10/668,030.

Note that the communication monitoring logic 31 may be implemented in hardware, software, or a combination thereof. Further, the logic 31 is shown in FIG. 1 as residing within the communication equipment 12a at the customer premises 14a. In other embodiments, the logic 31 may reside at other locations. For example, the logic 31 may reside within a transceiver (not specifically shown in FIG. 1) at the central office 28.

Figure 2:
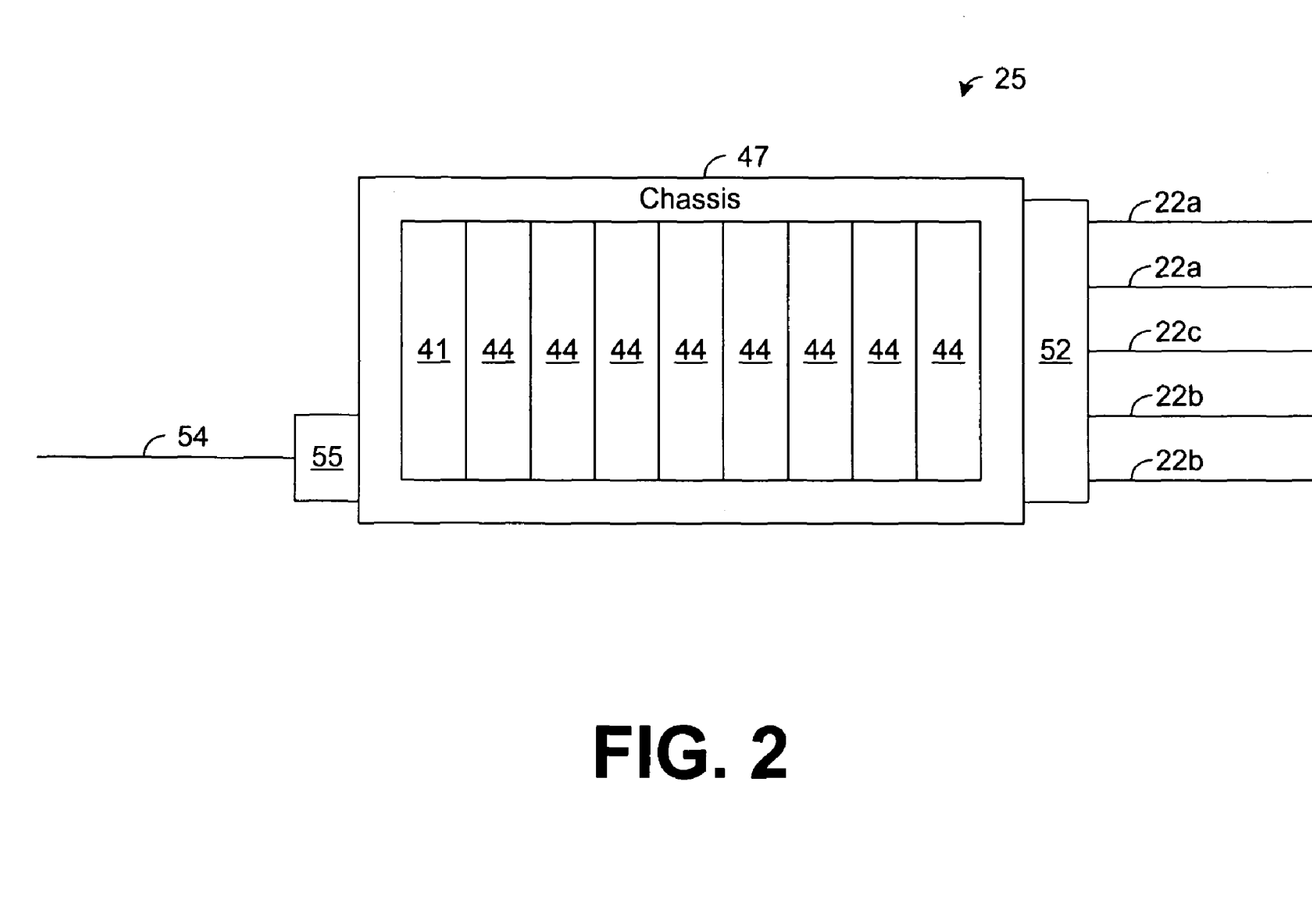
FIG. 2 is a block diagram illustrating an exemplary network access device depicted in FIG. 1.

FIG. 2 depicts a more detailed view of the network access device 25. The network access device 25 of FIG. 2 comprises at least one controller card 41 and a plurality of line cards 44 inserted into a chassis 47. Each of the subscriber lines 22a, 22b, and 22c is interfaced with a line interface 52 mounted on the chassis 47. The line interface 52 couples the subscriber lines 22a, 22b, and 22c to a chassis backplane 53 (FIG. 3), which couples the line interface 52 to the line cards 44. Note that the chassis backplane 53 also couples each of the line cards 44 to the controller card 41.

A network connection 54, such as a fiber optic cable, for example, carrying a high-speed data stream is coupled to a network interface 55 mounted on the chassis 47. The network interface 55 couples the network connection 54 to the chassis backplane 53, which couples the network interface 55 to the controller card 41. The backplane 53 comprises a plurality of conductive connections (e.g., copper traces) for conductively coupling the cards 41 and 44, as well as the interfaces 52 and 55, as described in more detail hereafter. Further, if the network connection 54 is indeed fiber optic, the network interface 55 may include a fiber optic transceiver (not shown) to convert optical signals from the connection 54 into electrical signals and for converting electrical signals from the controller card 44 into optical signals.

Figure 3:
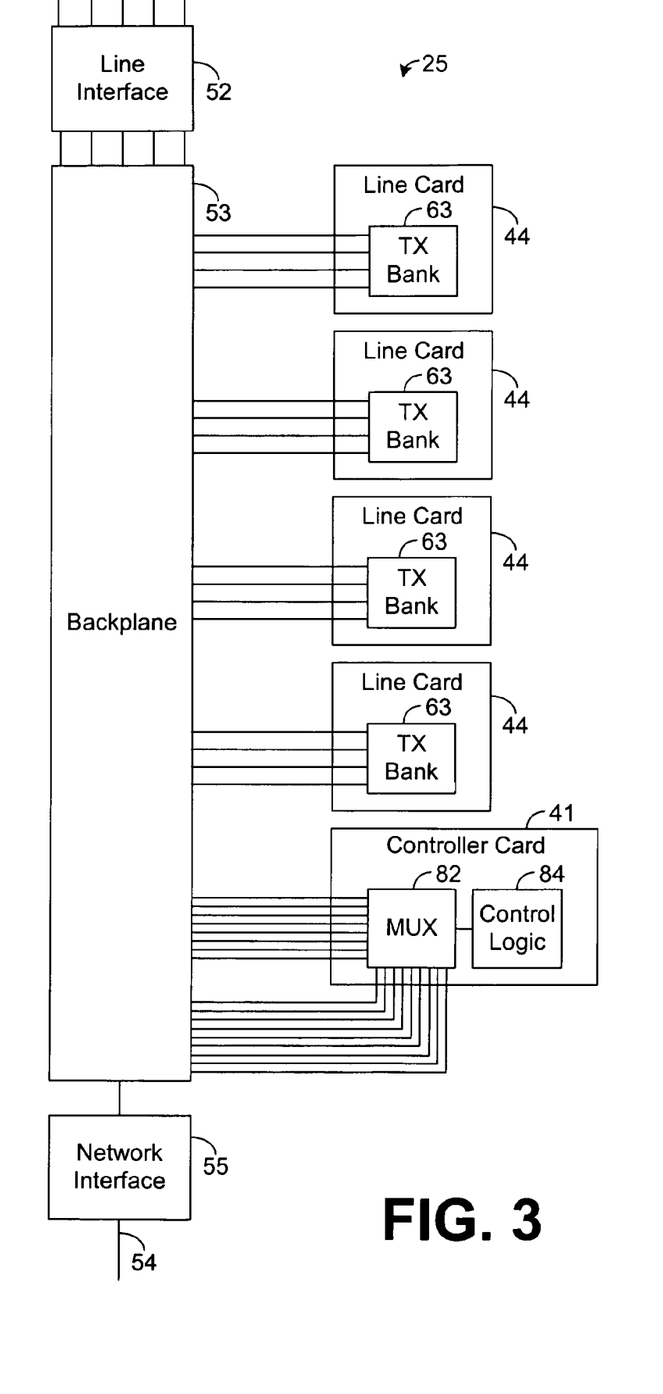
FIG. 3 is a block diagram illustrating the network access device of FIG. 2.
Figure 4:
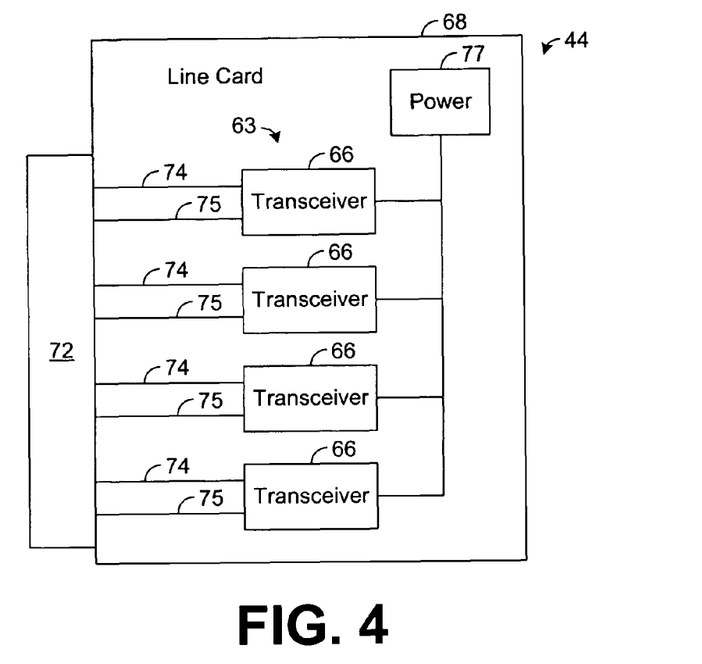
FIG. 4 is a block diagram illustrating an exemplary line card depicted in FIG. 3.

Referring to FIGS. 3 and 4, each line card 44 comprises a bank 63 of transceivers 66 mounted on a printed circuit board (PCB) 68. Each line card 44 also comprises a backplane interface 72 that interfaces the line card 44 with the chassis backplane 53. As shown by FIG. 4, each transceiver 66 is coupled to at least one connection 74 for communicating over a respective subscriber line 22a, 22b, or 22c and at least one connection 75 for communicating with the controller card 41. In this regard, the chassis backplane 53 couples each card connection 74 to the line interface 52, and the chassis backplane 53 couples each card connection 75 to the controller card 41. Each line card 44 may also comprise other components, such as a power supply 77, which provides power to each of the transceivers 66 and other components mounted on the same card 44.

Figure 5:
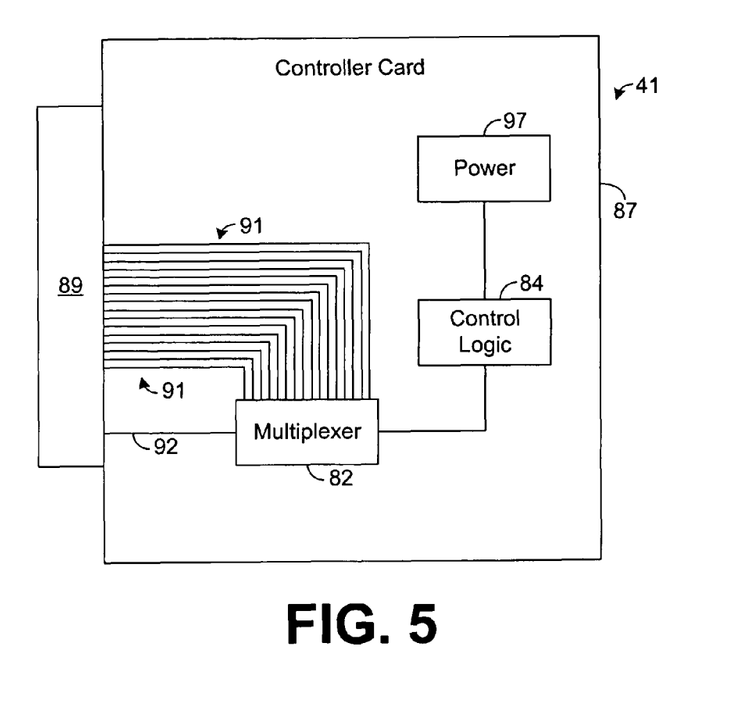
FIG. 5 is a block diagram illustrating an exemplary controller card depicted in FIG. 3.

As shown by FIG. 5, the controller card 41 comprises a multiplexer 82 and control logic 84 mounted on a PCB 87. The control logic 84 may be implemented in hardware, software, or a combination thereof. The controller card 41 also comprises a backplane interface 89 that interfaces the controller card 41 with the chassis backplane 53 (FIG. 3). As shown by FIG. 5, the multiplexer 82 is coupled to a plurality of connections 91 for communicating with the line cards 44 and at least one connection 92 that is coupled to the network connection 54 (FIG. 3). In this regard, the chassis backplane 53 couples each card connection 91 to a respective transceiver 66. The controller card 41 may also comprise other components, such as a power supply 97, which provides power to the control logic 84 and other components mounted on the same card 41.

In operation, the multiplexer 82 receives a high-speed data stream from the network connection 54 (FIG. 3) via connection 92. Operating under the control of the control logic 84, the multiplexer 82 demultiplexes the high-speed data stream into a plurality of lower speed data streams and transmits each such lower speed data stream to a different transceiver 66 (FIG. 4) via connections 91. The data stream received by a respective transceiver 66 from the multiplexer 82 is processed by this transceiver 66, which transmits the data stream over a respective one of the subscriber lines 22a, 22b, or 22c. As an example, a transceiver 66, using digital data from the data stream received from the controller card 41, may modulate an analog signal and transmit the modulated analog signal over one of the subscriber lines 22a, 22b, or 22c via connection 74 (FIG. 4).

For signals received by a transceiver 66 from a subscriber line 22a, 22b, or 22c, the transceiver 66 recovers the data defined by such signals. For example, the transceiver 66 may demodulate a modulated analog signal to recover digital data. The transceiver 66 then transmits the recovered data to the multiplexer 82 via a digital data stream. The multiplexer 82 multiplexes the data streams received from multiple transceivers 66 into a single data stream, and transmits this data stream over the network connection 54.

Figure 6:
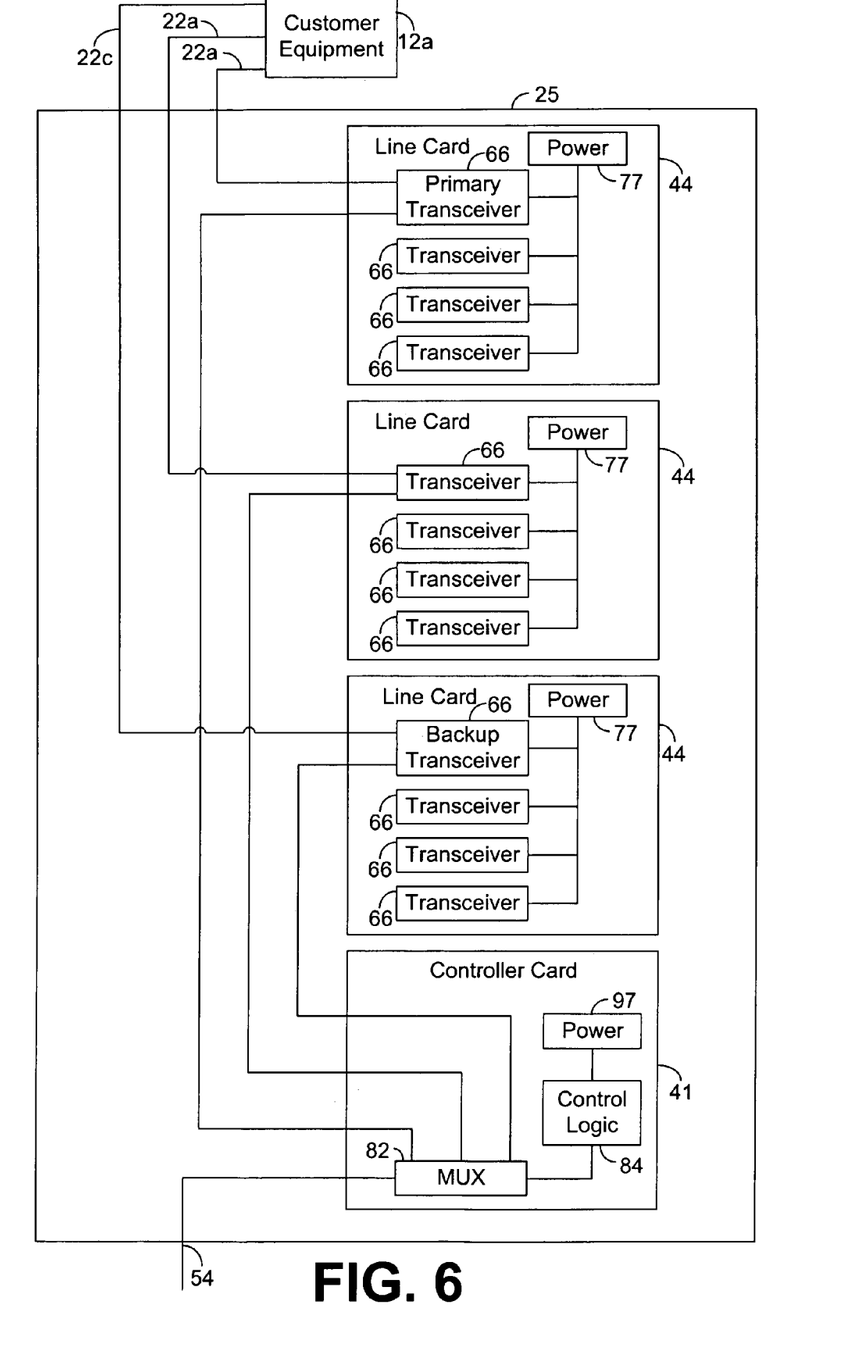
FIG. 6 is a block diagram illustrating the network access device of FIG. 3.

In one exemplary embodiment, the backup subscriber line 22c is coupled to a transceiver 66 mounted on a different line card 44 as compared to any of the transceivers 66 coupled to primary subscriber lines 22a. In fact, in a preferred embodiment, none of the subscriber lines 22a and 22c are coupled to transceivers 66 mounted on the same line card 44. For example, FIG. 6 shows a network access device 25 in accordance with one such embodiment. The interfaces 52, 55, 72, and 89 are not shown in FIG. 6 for simplicity.

As shown by FIG. 6, the backup subscriber line 22c is coupled to a transceiver 66 mounted on a different line card 44 as compared to the transceivers 66 coupled to the other subscriber lines 22a protected by the backup subscriber line 22c. Thus, if a problem occurs on a line card 44 interfaced with one of the primary subscriber lines 22a, the communication occurring over such primary subscriber line 22a can be switched to the backup subscriber line 22c. In this regard, if the problem is isolated to the line card 44 coupled to the primary subscriber line 22a, then it is likely that the operation of the transceiver 66 coupled to the backup subscriber line 22c is unaffected by the problem. Thus, communication over the backup subscriber line 22c is possible.

Note that if the backup subscriber line 22c, unlike the embodiment shown by FIG. 6, is coupled to a transceiver 66 mounted on the same line card 44 as the transceiver 66 that is coupled to a primary subscriber line 22a, then using the subscriber line 22c to backup the primary subscriber line 22a may be impossible in some circumstances. For example, if the card's power supply 77 fails, then all of the transceivers 66 on the same line card 44 may become inoperative. In such a case, neither the backup subscriber line 22c nor the primary subscriber line 22a may be used to communicate thereby disrupting service to customer premises 14a. Moreover, by having the backup subscriber line 22c coupled to a transceiver 66 mounted on a first line card 44 and having a primary subscriber line 22a coupled to a transceiver 66 mounted on a second line card 44, it is possible to switch communication from this primary subscriber line 22a to the backup subscriber line 22c, thereby preserving service to the customer premises 14a, in the event of a failure associated with the second line card 44.

It should be noted that the multiplexer 82 and control logic 84 have generally been described above as residing on a controller card 41 inserted into the same chassis 47 (FIG. 2) as the line cards 44 interfaced with the subscriber lines 22a, 22b, and 22c. However, in other embodiments, it is possible for the multiplexer 82 and control logic 84 to be located external to the chassis 47. Further, it is unnecessary for the line cards 44 coupled to the subscriber lines 22a, 22b, and 22c to be located in the same chassis 47. As an example, it is possible for the line card 44 coupled to a primary subscriber line 22a and the line card 44 coupled to a backup subscriber line 22c to be inserted into different chassises 47.

An exemplary methodology in accordance with the present disclosure will now be described with particular reference to FIGS. 6 and 7.

Figure 7:
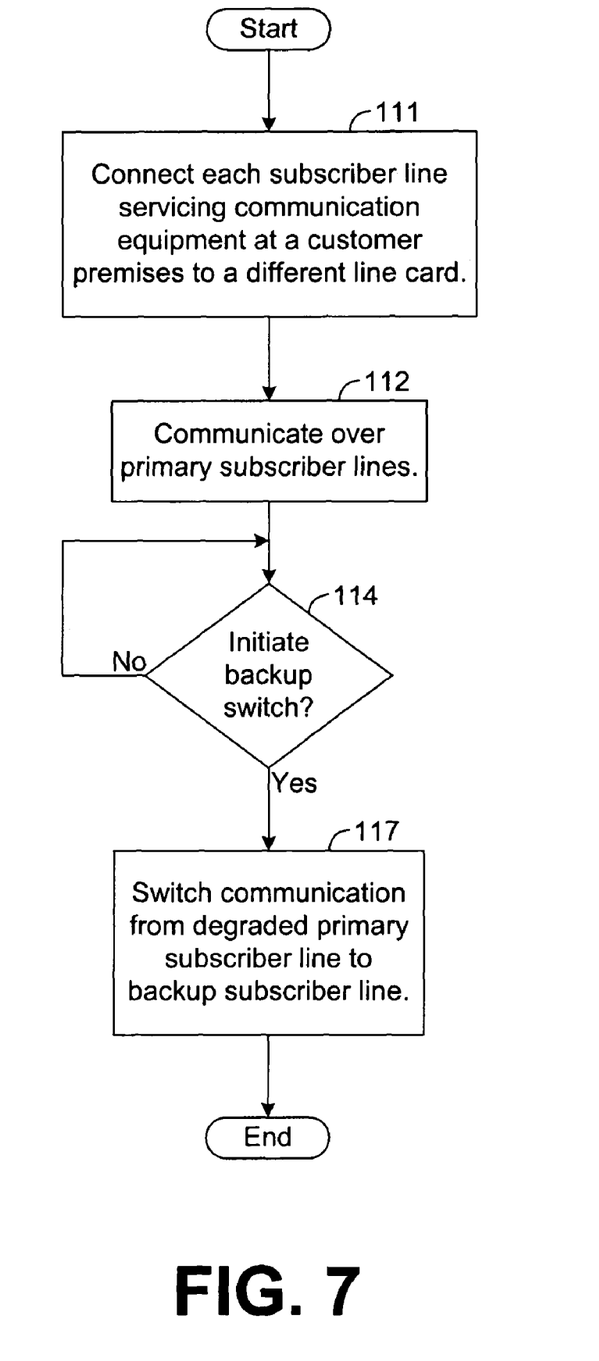
FIG. 7 is a flow chart illustrating an exemplary methodology for configuring and using the network access device of FIG. 3.

In configuring the network access device 25, a service provider ensures that each of the subscriber lines 22a and 22c servicing the communication equipment 12a at customer premises 14a (FIG. 1) is interfaced with a different line card 44, as shown by block 111 of FIG. 7. As an example, the service provider may configure the network access device 25 as shown by FIG. 6. For illustrative purposes, a transceiver 66 residing on a first line card 44 and coupled to one of the primary subscriber lines 22a will be referred to hereafter as "primary transceiver 66," and a transceiver 66 residing on a second line card 44 and coupled to the backup subscriber line 22c will be referred to hereafter as "backup transceiver 66."

Initially, the control logic 84 is configured to control the multiplexer 82 such that data from the network connection 54 destined for communication equipment 12a is transmitted to the primary transceiver 66, which then communicates such data over a primary subscriber line 22a to communication equipment 12a in block 112 of FIG. 7. However, assume that the power supply 77 of the line card 44 on which the primary transceiver 66 is mounted fails. As a result of such failure, assume that all of the transceivers 66, including the primary transceiver 66, on the foregoing line card 44 become inoperative. The communication monitoring logic 31 detects that communication over the primary subscriber line 22a coupled to the primary transceiver 66 has been disrupted by determining that the communication equipment 12a is no longer receiving signals from the primary transceiver 66. In response to such a detection, the logic 31 determines that a backup switch should be initiated in block 114 of FIG. 7. In particular, the logic 31 determines that communication should be switched to the backup subscriber line 22c from the primary subscriber line 22a that is coupled to the primary transceiver 66.

To initiate such a backup switch, the logic 31 instructs the communication equipment 12a to begin communicating over the backup subscriber line 22c in lieu of the primary subscriber line 22a that is coupled to the primary transceiver 66. The logic 31 also transmits, to the central office 28 (FIG. 1), a backup switch command that is ultimately received by the control logic 84. As an example, it is possible for the logic 31 to communicate such a command over one of the operational subscriber lines 22a or 22c to one of the transceivers 66 of the network access device 25. Such a transceiver 66 may then communicate the command to the control logic 84. The command may be embedded in one of the data streams received by multiplexer 82 or the command may be transmitted via a connection (not shown) that bypasses the multiplexer 82 and couples directly to the control logic 84. Other techniques for communicating the command to the control logic 84 are possible.

In response to the backup switch command, the control logic 84 controls the multiplexer 82 such that data from the network connection 54 that would have otherwise been communicated to the primary transceiver 66 is instead communicated to the backup transceiver 66. Thus, the backup transceiver 66 and the communication equipment 12a begin communicating over the backup subscriber line 22c. Accordingly, as shown by block 117 of FIG. 7, communication is switched to the backup subscriber line 22c from the subscriber line 22a that is coupled to the primary transceiver 66.

By implementing the methodology described above, it is possible for the communication equipment 12a to continue communicating with the central office 28 over the same number of subscriber lines 22a and 22c both before and after the failure of the power supply 77 that is coupled to the primary transceiver 66. As a result, it is possible for the communication equipment 12a to maintain a relatively high data rate despite the failure of the power supply 77 for the primary transceiver's line card 44. Note that, in the instant example, a switch over to the backup subscriber line 22c may have been impossible if the failure of the power supply 77 had caused both the primary and backup transceivers 66 to become inoperative, such as may be the case when the primary and backup transceivers 66 are mounted on the same line card 44 instead of being mounted on separate line cards 44 as described above. Thus, by ensuring that the primary transceiver 66 and the backup transceiver 66 are mounted on different line cards 44, as described above, it is possible to improve the service being provided to the customer equipment 12a.

The invention claimed is:

1. A network access device, comprising:
    a plurality of line cards coupled to a plurality of subscriber lines, each of the subscriber lines coupled to communication equipment for servicing a customer, the communication equipment at a single customer premises, each of the line cards having a transceiver coupled to a respective one of the subscriber lines;
    a line card having a backup transceiver coupled to a backup subscriber line for backing up each of the plurality of subscriber lines, the backup subscriber line coupled to the communication equipment for servicing the customer; and
    logic configured to switch communication from one of the subscriber lines to the backup subscriber line in response to a detection of an error condition for the communication occurring over the one subscriber line, wherein the line card having the backup transceiver is coupled to the communication equipment for servicing the customer via a single subscriber line, wherein each of the plurality of line cards is coupled to the communication equipment for servicing the customer via a single respective subscriber line, wherein the backup subscriber line extends from the network access device to the communication equipment for servicing the customer thereby providing a first data path from the network access device to the communication equipment, wherein the one subscriber line extends from the network access device to the communication equipment servicing the customer thereby providing a second data path from the network access device to the communication equipment, and wherein the first data path is separate from the second data path.

2. The device of claim 1, further comprising a controller card having a multiplexer, the multiplexer coupled to each of the line card having the backup transceiver and the plurality of line cards.

3. The device of claim 2, wherein the plurality of line cards have a plurality of transceivers, and wherein the multiplexer is configured to separately transmit a plurality of data streams to the plurality of transceivers, each of the plurality of transceivers configured to receive a respective one of the plurality of data streams.

4. The device of claim 2, further comprising a chassis, wherein the plurality of line cards, the line card having the backup transceiver, and the controller card are each inserted into the chassis.

5. The device of claim 4, wherein the chassis has a backplane that couples the controller card to the plurality of line cards and line card having the backup transceiver.

6. A network access device, comprising:
    a plurality of line cards coupled to a plurality of primary subscriber lines extending to a single customer premises, each of the line cards having a primary transceiver coupled to a respective one of the primary subscriber lines, each of the primary subscriber lines coupled to communication equipment at the customer premises;
    a line card having a backup transceiver coupled to a backup subscriber line for backing up the primary subscriber lines, the backup subscriber line coupled to the communication equipment at the customer premises; and
    logic configured to demultiplex a high speed data stream into a plurality of lower speed data streams and to selectively switch one of the lower speed data streams between one of the primary subscriber lines and the backup subscriber line based on a status of communication occurring over the one primary subscriber line, wherein the line card having the backup transceiver is coupled to the communication equipment at the customer premises via a single subscriber line, wherein each of the plurality of line cards is coupled to the communication equipment at the customer premises via a single respective subscriber line, wherein the backup subscriber line extends from the network access device to the communication equipment at the customer premises thereby providing a first data path from the network access device to the communication equipment, wherein the one primary subscriber line extends from the network access device to the communication equipment at the customer premises thereby providing a second data path from the network access device to the communication equipment, and wherein the first data path is separate from the second data path.

7. The network access device of claim 6, wherein the logic is mounted on a printed circuit board separate from the plurality of line cards and the line card having the backup transceiver.

8. The network access device of claim 7, further comprising a chassis having a backplane, wherein the first line card, the second line card, and the printed circuit board are interfaced with the backplane.

9. A network access method, comprising the steps of:
    providing a plurality of line cards at a network facility, each of the line cards having a respective transceiver, the plurality of line cards including at least a first line card, a second line card, and a third line card;

coupling each of the first, second, and third line cards to a respective one of a plurality of subscriber lines, each of the plurality of subscriber lines extending from the network facility to a single customer premises;

communicating data between the first and second line cards and communication equipment at the customer premises;

detecting an error condition associated with communication occurring over one of the subscriber lines;

ensuring that each of the plurality of line cards is coupled to the communication equipment via a single respective subscriber line; and switching communication from the one subscriber line to the subscriber line coupled to the third line card in response to the detecting step, wherein the one subscriber line and the subscriber line coupled to the third line card provide separate data paths from the network facility to the customer premises.

10. The method of claim 9, further comprising the step of communicating, via the each of the plurality of subscriber lines, data destined for communication equipment at the same customer premises.

* * * * *